US008566471B1

(12) United States Patent
Alecci et al.

(10) Patent No.: US 8,566,471 B1
(45) Date of Patent: Oct. 22, 2013

(54) METHOD OF PROVIDING NETWORK LINK BONDING AND MANAGEMENT

(75) Inventors: Anthony Alecci, Landing, NJ (US); Joel Michael Ezell, Broomfield, CO (US); Michael Jonathan Herman, Lakewood, NJ (US); Ronald Samuel Roehrig, Tinton Falls, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1717 days.

(21) Appl. No.: 11/327,910

(22) Filed: Jan. 9, 2006

(51) Int. Cl.
G06F 15/16 (2006.01)
G06F 15/173 (2006.01)

(52) U.S. Cl.
USPC ............ 709/232; 709/227; 709/236; 709/238

(58) Field of Classification Search
USPC .......................................... 709/200, 227–244
See application file for complete search history.

(56) References Cited

U.S. PATENT DOCUMENTS

| | | | | |
|---|---|---|---|---|
| 6,049,528 | A * | 4/2000 | Hendel et al. | 370/235 |
| 6,563,821 | B1 * | 5/2003 | Hong et al. | 370/389 |
| 2003/0105830 | A1 * | 6/2003 | Pham et al. | 709/216 |
| 2003/0172145 | A1 * | 9/2003 | Nguyen | 709/223 |
| 2004/0073683 | A1 * | 4/2004 | Beck et al. | 709/227 |
| 2004/0090972 | A1 * | 5/2004 | Barrett et al. | 370/401 |
| 2005/0025150 | A1 * | 2/2005 | Helmy et al. | 370/392 |
| 2006/0168274 | A1 * | 7/2006 | Aloni et al. | 709/230 |

OTHER PUBLICATIONS

The ARTFL Project—Webster's Revised Unabridged Dictionary 1913. http://machaut.uchicago.edu/?resource=Webster%27s&word=redundant&use1913=on&use1828=on.*
Networking Linux®: A Practical Guide to TCP/IP. Pat Eyler. Print ISBN-10: 0-7357-1031-7; Print ISBN-13: 978-0/7357-1031-3. Pub Date: Mar. 21, 2001.*
"Amendment to carrier sense multiple access with collision detection (CSMA/CD) access method and physical layer specifications-aggregation of multiple link segments". IEEE 802.3ad-2000. E-ISBN: 0-7381-2473-7. ISBN: 0-7381-2472-9. Published: Jun. 28, 2000.*
Avaya. "Avaya MultiVantage™; Application Enablement Services; ASAI Protocol Reference; Release 3.1.0". 03-300550. Release May 2006. Issue 2. <support.avaya.com/css/P8/documents/100013744>.*
Request for Comment. Information Sciences Institute University of Southern California. "Transmission Control Protocol; DARPA Internet Program; Protocol Specification". RFC 793. Published: Sep. 1981. http://www.faqs.org/rfcs/rfc793.html>.*

* cited by examiner

Primary Examiner — Ashok Patel
Assistant Examiner — Kevin Bechtel
(74) Attorney, Agent, or Firm — Anderson Gorecki & Rouille LLP (57) ABSTRACT

A method, apparatus and computer program product for providing network link bonding and management is presented. At least one physical link is established between a first endpoint and a second endpoint. A logical link is established at an application server level between the first endpoint and the second endpoint, the logical link including said at least one physical link. At least one physical link is used to provide communications between the first endpoint and the second endpoint. Messages are distributed among the physical links and the received messages are ordered into a single stream for the higher layer application.

19 Claims, 6 Drawing Sheets

METHOD OF PROVIDING NETWORK LINK BONDING AND MANAGEMENT

BACKGROUND

Channel bonding involves multiple physical connections which are bonded into a single logical connection. Channel bonding is a method where the data in each message gets striped across multiple network cards installed in each machine. In a particular method, channel bonding doubles the communication rate while only adding about ten percent to the overall cost. One way to perform channel bonding is to use multiple transceivers working in parallel. For example, data words in a transmitter can be split into bytes, with each byte sent over a separate transceiver. The bytes are received in parallel by separate transceivers in a receiver. The received bytes are then combined in the correct sequence to recover the original words. The communication path of each transceiver pair (one in the transmitter and one in the receiver) is called a "channel". These methods depend on parallel communication channels to achieve adequate sustained message transfer rates.

SUMMARY

Conventional mechanisms such as those explained above suffer from a variety of deficiencies. One such deficiency is that in conventional systems, most channel bonding is done below the Transmission Control Protocol (TCP) level, and therefore TCP is used to handle reordering of messages. Thus, channel bonding is not used at an application server level, which would require ordering of the received messages.

Embodiments of the invention significantly overcome such deficiencies and provide mechanisms and techniques that provide efficient network link bonding and management to higher layer applications. This includes the provision of dynamic bandwidth management, link redundancy and flow control. Applications need to manage multiple physical links while treating them as a single logical link. When bonding multiple physical links (e.g. sockets) into a single logical link, there should be an efficient technique to distribute messages among the links on the near end, and on the far end to order the messages into a single stream to be presented to the higher layer application. Applications may require the ability to add and remove bandwidth dynamically and transparently. For example, applications may require the ability to increase bandwidth when the current bandwidth capacities have been exceeded. Applications may further require the ability to continue to function seamlessly under partial network failures or short complete failures that recover. An IT manager needs to be able to control resources used (e.g., application, links, servers, etc.) based on business needs.

The present method of providing network link bonding and management provides a logical connection between communication endpoints and allows for one or more physical socket connections, wherein the more connections, the more available bandwidth. Connections can be dynamically added or removed to active sessions. The method of providing network link bonding and management provides what can be thought of as one big pipe between the communication endpoints, such that within the pipe, applications on each end can establish links with each other, and can establish logical links within the pipe. Communication behavior remains unchanged for applications. This method of providing network link bonding and management multiplexes application data messages over those connections, manages distribution of messages across all connections including overall and per application flow control, re-orders messages for applications, automatically recovers failed connections and retransmits lost messages.

In a particular embodiment of a method for providing network link bonding and management, the method includes establishing at least one physical link between a first endpoint and a second endpoint. A logical link is established at an application server level between the first endpoint and the second endpoint. The method further includes using at least one physical link to provide communications between the first endpoint and the second endpoint.

Other embodiments include a computer readable medium having computer readable code thereon for providing network link bonding and management. The medium includes instructions for establishing at least one physical link between a first endpoint and a second endpoint. The medium also includes instructions for establishing a logical link at an application server level between the first endpoint and the second endpoint, the logical link including at least one physical link. The medium additionally includes instructions for using at least one physical link to provide communications between the first endpoint and the second endpoint.

Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides network link bonding and management as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing network link bonding and management as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method and computer readable medium for providing network link bonding and management is disclosed. At least one physical link is established between a first endpoint and a second endpoint. A logical link is established at an application server level between the first endpoint and the second endpoint, the logical link including at least one physical link. At least one physical link is used to provide communications between the first endpoint and the second endpoint. The use of at least one physical link includes distributing messages among a plurality of the physical links. The received messages from the plurality of the physical links are ordered into a single stream.

Bandwidth management is provided within the logical link by using the physical links to increase bandwidth for an application and to remove bandwidth for an application. The physical links can also be used to provide link redundancy and/or flow control. Flow control can be accomplished by using the physical links to limit a message rate from client applications through the Terminal Control Interface (-TCI), limit a rate per physical link and limit a rate per a collection of physical links. The logical link may be secured using Transport Layer Security (TLS). The logical links can further be used as part of a scheme to recover failed connections between the first endpoint and the second endpoint. The logical links may also be used for retransmitting lost messages between the first endpoint and the second endpoint.

One example of where this might be useful is if one of the entities in a system has multiple network interfaces, possibly on different Local Area Network (LAN) segments. The present method of providing network link bonding and management could then be used to send more data across the bonded link than could be supported by a single network interface. This also provides added robustness since one of the sockets could go down and be removed from the pool of sockets while the traffic is redistributed to the remaining sockets.

Figure 1:
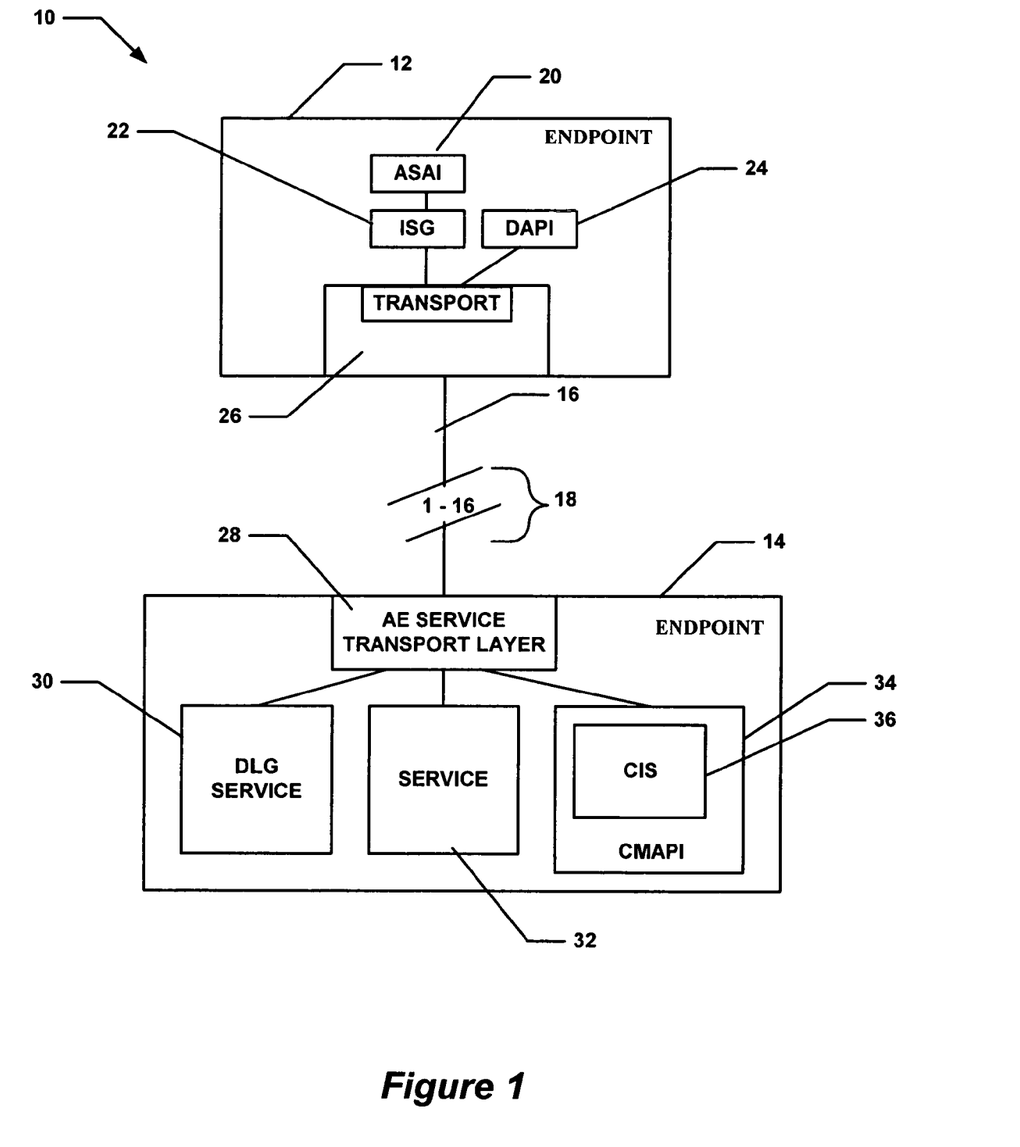
FIG. 1 comprises a block diagram of a system for providing network link bonding and management between two endpoints in accordance with embodiments of the invention.

A particular embodiment of providing network link bonding and management is shown in FIG. 1. The environment 10 of FIG. 1 includes a first endpoint 12 in communication with a second endpoint 14. Communication between the first endpoint 12 and second endpoint 14 is accomplished via a logical link 16, which includes a plurality of physical links 18. While a particular embodiment the logical link 16 comprises sixteen physical links 18, it should be appreciated that the logical link 16 may include any number of physical links 18.

The communication between endpoint 12 and endpoint 14 in a particular example is a Local Area Network (LAN) Gateway connection. The LAN gateway is a pure transport, and tunnels messages over Transmission Control Protocol/Internet Protocol (TCP/IP). The endpoint 14 initiates client connections, and has a one-to-one relationship between client connections and links in the endpoint 12 servers. Since the LAN gateway is a pure transport, it can be used to tunnel any data. Therefore, it can be extended to allow data from different sources in the endpoint 12 (e.g., source 20 and source 22) to be tunneled over the same pipe (also referred to as a tunnel) 16 between endpoint 12 and endpoint 14. Furthermore, it will be extended to support a set of pipes 18 (i.e., TCP/IP connections) for the tunnel 16 between those endpoints, which will allow load balancing. The set of pipes 18 also provides for redundancy wherein if one pipe is lost, data flows over the remaining pipes. In a particular embodiment, endpoint 12 is a Communication Manager (CM), endpoint 14 is an Application Enablement Services (AES) device and the extended protocol is referred to as the Application Enablement Protocol (AEP). A TCP/IP connection utilizing the AEP between a CM and an AE Services server is called an AEP connection.

A CM/AEP session is the collection of TCP/IP connections 18 between the CM server 12 and an AE Services server 14 over which the AEP is utilized. The TCP/IP connections are made over secure sockets. In this embodiment, there can be up to 16 AEP connections 18 between the CM server 12 and an AE Services server 14, although other embodiments may include any number of connections between the two endpoints. Each CM server 12 can support 16 AEP connections 18. Each AE Services server 14 can support up to 16 AEP connections 18 also. This allows for a single CM server 12 to support multiple AE Services servers 14, and for a single AE Services server 14 to connect to multiple CM servers 12. A CM/AEP session is established when the first AEP connection is established, and is ended when the last AEP connection is torn down.

Figure 2:
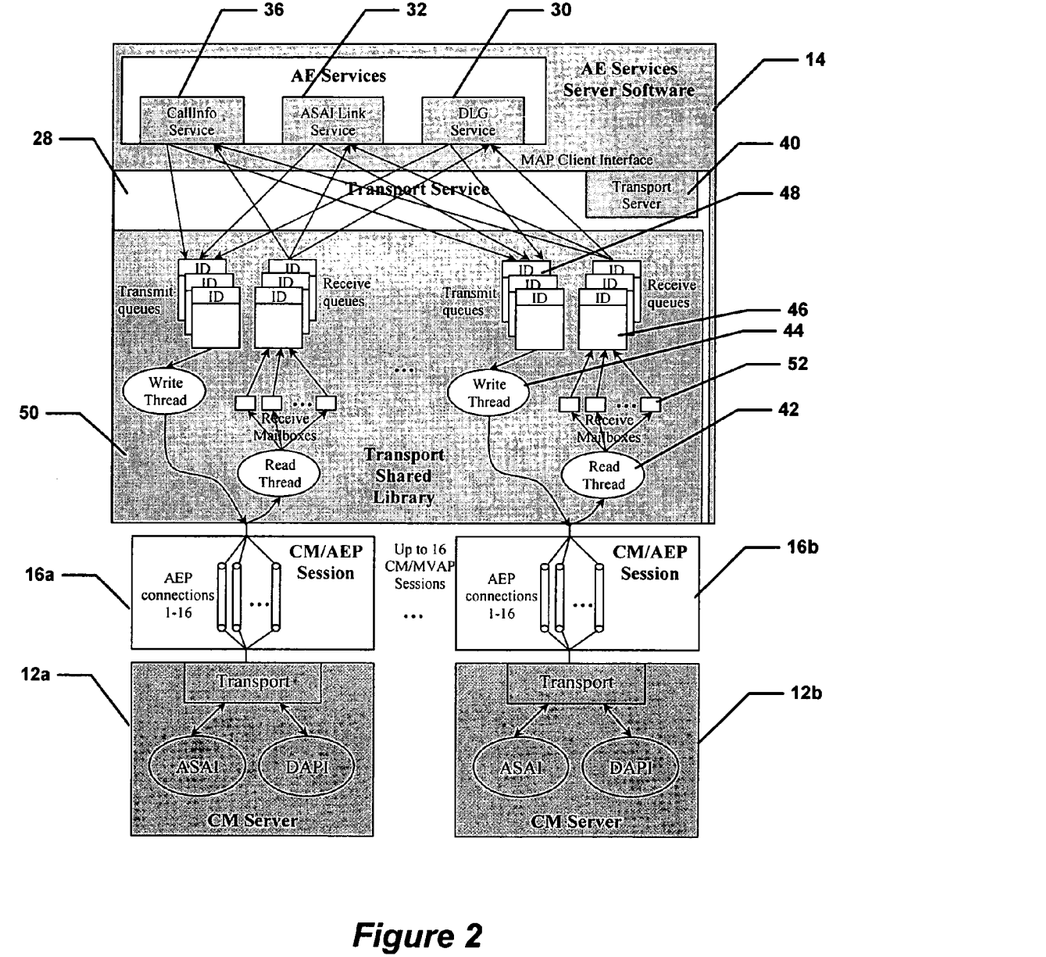
FIG. 2 is a block diagram of a system for providing network link bonding and management between two CM servers and a single AE server in accordance with embodiments of the invention.

The Transport Service 28 on the AE Services server 14 is implemented as a both a startable service (i.e., a process) and as a shared library. Communication between AE Services and the transport layer 28 is via a Transport Client Interface (TCI). FIG. 2 shows the high level architecture of the transport service.

Referring now to FIG. 2, the AE Services transport layer 28 includes a process, known as the transport server 40, and a library 50, which implements the TCI. The transport server 40 is a daemon process started as a service on the AE Services server 14 when the server is booted. Transport server 40 is responsible for creating and managing CM/AEP sessions 16a and 16b, and also for creating and managing AEP connections. For each CM/AEP session, the transport server 40 starts a read thread 42 and a write thread 44. The transport server 40 will also start a connection thread. The session thread is responsible for starting (sequentially) and managing the AEP connections.

Data is exchanged through the transport layer 28 with the TCI. Each connection into the transport layer for a given CM/AEP session is given a unique ID. Each ID has it's own read queue 46 and write queue 48 in the transport layer. These queues 46 and 48 are maintained in a shared memory segment, managed by the transport layer.

Figure 3:
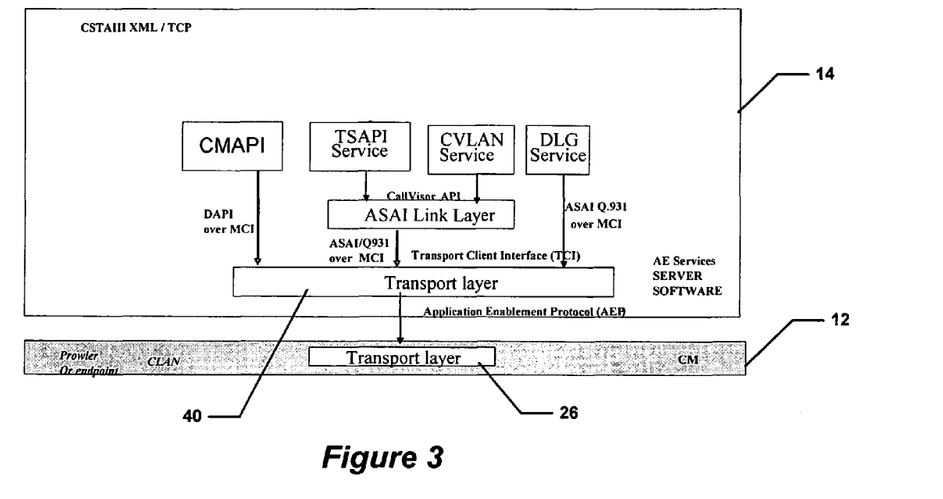
FIG. 3 comprises a high level block diagram of a CM server and an AE server.

Referring now to FIG. 3, a particular embodiment wherein the Communication Manager Application Program Interface (CMAPI) and Telephony Services Application Programming Interface TSAPI are running on a single machine is shown. The AE Services transport layer 40, which is based on the LAN gateway client, is now part of the interface process, and handles the transport level messaging with the CM server 12 for both Avaya Computer Telephony and Communications Manager API. The AE Services connection to CM comprises up to 16 sockets that carry the messages for all 16 Adjunct Switch Application Interface (ASAI) links and all 7 Developer Application Programming Interface (DAPI) links (CMAPI only uses 3 of the 7). Each socket is identical in functionality, and they may be used for redundancy. The sockets are secured via TLS. On the Communication Manager 12, a new process has MUX/DEMUX functionality to distribute messages to/from the proper ASAI link or DAPI link.

The Application Enablement Protocol (AEP) is a derivation of the TCP Tunnel Protocol. This protocol is used to communicate between the CM server 12 and the AE Services server 14 for call control and signaling information (currently ASAI and DAPI links). For an AEP connection 18, the CM server 12 is considered the server, and the AE Services server 14 is considered the client (since the CM server 12 is the one listening for AEP connections 18). The AEP includes a ten-byte header followed by optional, additional data. All data in the header is in network byte order, and the protocol makes no assumptions about the optional data supplied.

Three fields have been added to the original TCP Tunnel Protocol header to form the ten-byte header to allow messages to be multiplexed over multiple TCP connections between the CM server 12 and the AE Services server 14. The three fields include an ID field, a Send sequence number field and a Reserved field. The ID field identifies the logical link for which the message is intended. An ID of 0 indicates that the message is for the Transport layer 40 directly. The Send sequence number is used to re-order the messages received over multiple TCP connections. The sequence number is sequential within a CM/AEP session. The Reserved field can be used for a receive sequence number, if in the future re-transmission of lost messages is supported.

Since CM/AEP sessions can contain multiple AEP connections, and any AEP message can be sent over any available AEP connection in that session, the transport layer on either side of the AEP connections includes a mechanism for re-ordering received messages.

The transport write mechanism is essentially the same for both CM and AE Services. The transport layer 26 favors a single AEP connection for writing. When there is data to write, the transport layer will write to the same AEP connection as long as there is available bandwidth on that connection. If the current AEP connection runs out of bandwidth, the transport layer will move to the next AEP connection in its list. If all AEP connections have no available bandwidth, the transport layer will either wait until there is available bandwidth, if it can, or it will drop the message.

As shown in FIGS. 2 and 3, the transport read mechanism is essentially the same for both CM and AE Services. The transport layer has a mailbox 52 associated with each AEP connection. If the mailbox 52 for a particular AEP connection is empty, and data is waiting on that AEP connection, it will be read into the mailbox. The AEP header is always read first. When an AEP header is received, it is checked for valid syntax and context before any optional additional data is read. Any error detected with the AEP header will result in an Error Notification message being sent and termination of the AEP connection. When a complete AEP message is read into a mailbox, the transport layer 28 will determine if it is a control message (i.e., peer-to-peer transport AEP message) or a data message (i.e., AEP message is destined for an upstream application). Control messages are processed immediately. Data messages are processed within the order of the sequence numbers. The original sequence numbers are seeded with the sequence number received in the first Connection Request and Connection Accepted AEP messages in a CM/AEP session, and are unidirectional (i.e., each side maintains it's own send sequence numbers).

The reader process has an expectation of the next expected sequence number. If a message is in a mailbox with that sequence number, it is sent upstream and the sequence number is bumped. If the expected message is not in a mailbox, but there is at least one message in a mailbox (i.e., the expected message has not arrived, but subsequent messages have), a timer will be set (if not already set). If the expected message is received before the timer expires, the message is sent upstream and the timer is reset. If the timer expires before the expected message is received, that message is presumed dropped. The transport layer 28 will then examine the existing messages in the mailboxes and re-seed its expected sequence number, sending up the next corresponding message. If a data message is received after it has been presumed dropped, the transport layer 28 will discard it. This is determined by examining the relative delta between the sequence number in the received message and the expected sequence number.

Figure 4:
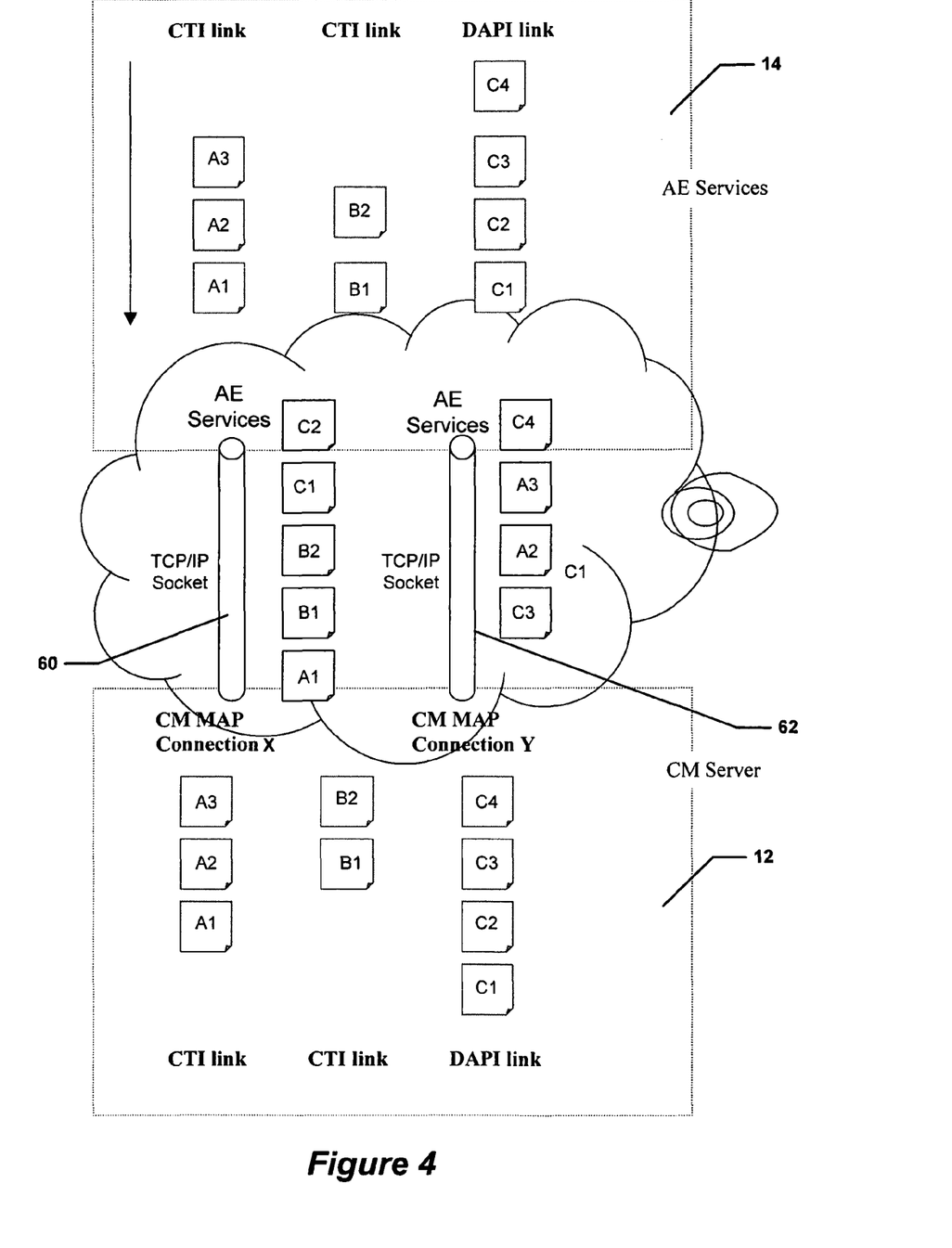
FIG. 4 comprises a high level block diagram showing message ordering.

Referring now to FIG. 4, an example of message transport and ordering is shown. Messages A1-A3, B1-B2 and C1-C4 are shown in AE Services server 14. The messages arrive on logical links on the AE services 14, and the order of the messages is preserved within the logical link. The messages are distributed freely across the transport connections. In this example, two physical links 60 and 62 are shown, which are both part of a single logical link. A first physical connection 60 is used to transport messages A1, B1, B2, C1 and C2. A second physical connection 62, also part of the single logical connection, is used to transport messages C3, A2, A3 and C4. The messages are then reordered on the CM server 12.

Figure 5A:
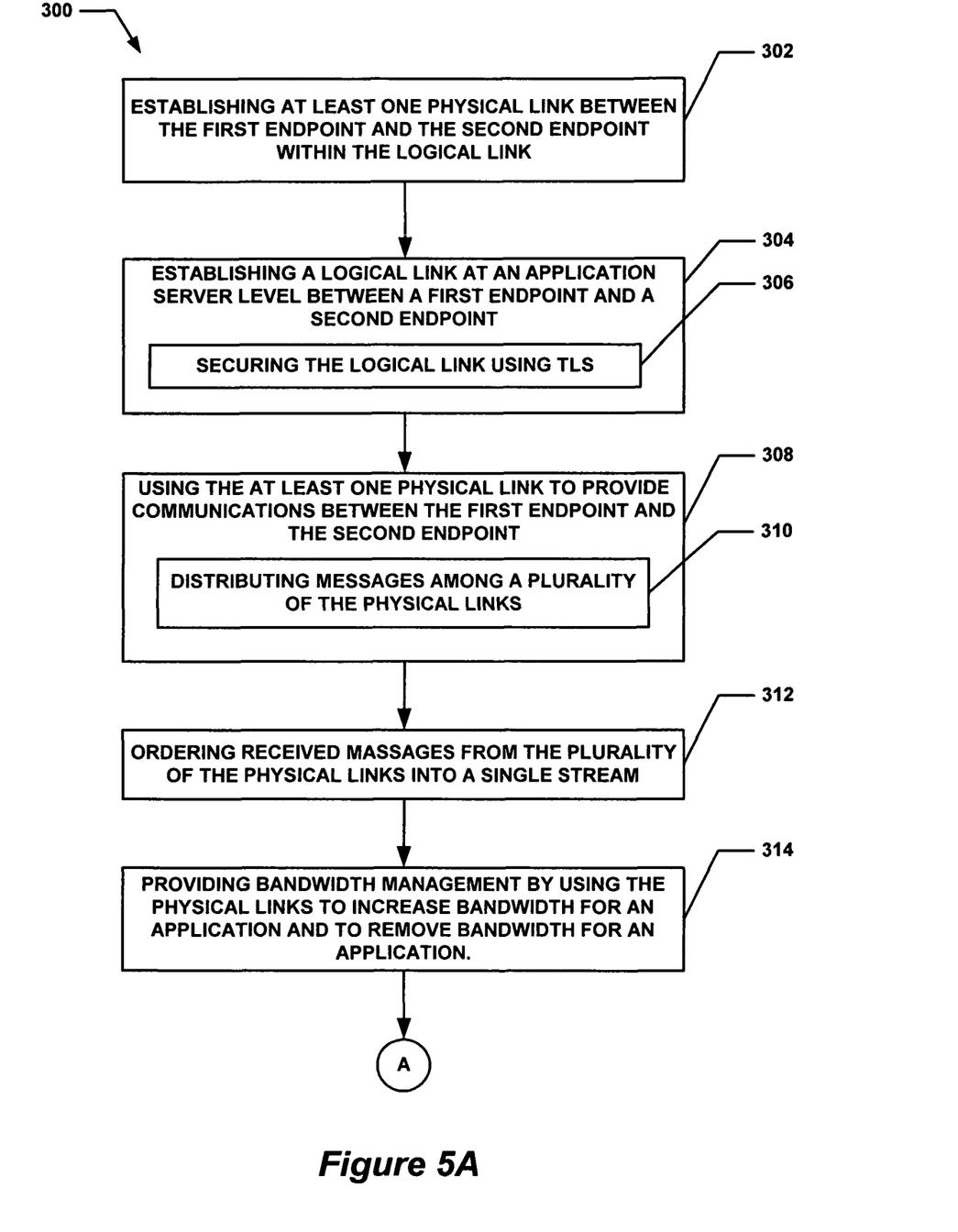
FIGS. 5A and 5B comprise flow diagrams of a particular embodiment of a method for providing network link bonding and management in accordance with embodiments of the invention.
Figure 5B:
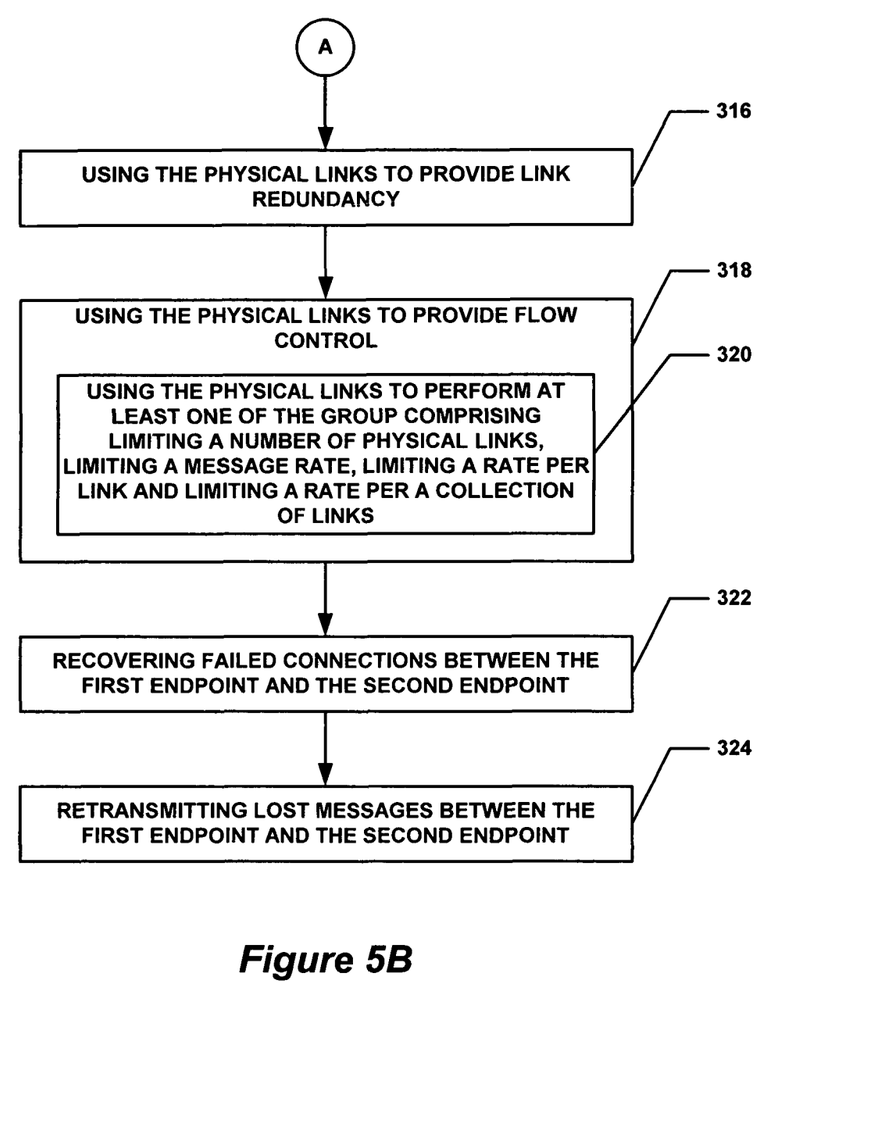

A flow chart of a particular embodiment of the presently disclosed method of providing network link bonding and management is depicted in FIGS. 5A and 5B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, a particular embodiment of a method of providing network link bonding and management 300 is shown. Method 300 begins with processing block 302 which discloses establishing at least one physical link between the first endpoint and the second endpoint within the logical link. The physical links may realized as TCP/IP socket connections or the like.

Processing block 304 states establishing a logical link at an application server level between a first endpoint and a second endpoint. As shown in processing block 306, the logical link may be secured using TLS. The logical link may be thought of as a pipe between the first and second endpoints.

Processing block 308 states using at least one physical link to provide communications between the first endpoint and the second endpoint. As shown in processing block 310, using at least one physical link can include distributing messages among a plurality of the physical links.

Processing block 312 discloses ordering received messages from the plurality of the physical links into a single stream. This is performed to provide a single ordered stream for higher layer applications. As stated in processing block 314, bandwidth management can be accomplished by using the physical links within the logical link to increase bandwidth for an application and to remove bandwidth for an application.

Processing block 316 discloses using the physical links to provide link redundancy, while processing block 318 recites using the physical links to provide flow control. As disclosed in processing block 320, the use of the physical links to provide flow control can include using the physical links to limit a number of physical links, limit a message rate, limit a rate per link or limit a rate per a collection of links.

Processing block 322 recites recovering failed connections between the first endpoint and the second endpoint. Processing block 324 states retransmitting lost messages between the first endpoint and the second endpoint.

The above-described method of providing network link bonding and management incorporates a logical connection between communication endpoints and allows for one or more physical socket connections, wherein the more connections, the more available bandwidth. Connections can be dynamically added or removed from active sessions. The present method of providing network link bonding and management provides one big pipe between the communication endpoints, such that within that pipe, applications on each end can establish links with each other, and can establish logical links within the pipe. Communication behavior remains unchanged for applications. This invention multiplexes application data messages over those connections, manages distribution of messages across all connections including overall and per application flow control, re-orders messages for applications, and automatically recovers failed connections and retransmits lost messages.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of providing network link bonding and management comprising:
   establishing a plurality of physical links between a first endpoint and a second endpoint, each physical link comprising a Transmission Control Protocol (TCP) link, and wherein said TCP links are in parallel with each other;
   establishing a logical link at an application server level between said first endpoint and said second endpoint, said logical link including said physical links;
   using said physical links to provide communications between said first endpoint and said second endpoint; and
   using said physical links to provide link redundancy and wherein said communications occur at the transport layer of the Open System Interconnect (OSI) model using a modified TCP tunnel protocol header, wherein said modified TCP tunnel protocol header includes a plurality of fields added to an original TCP tunnel protocol header to form a ten byte header to allow messages to be multiplexed over multiple TCP connections within said logical link, wherein a first field of said plurality of fields added to an original TCP tunnel protocol header comprises an ID field used for identifying a logical link for which the message is intended, and wherein a second field of said plurality of fields added to an original TCP tunnel protocol header comprises a Send sequence number field used for re-ordering messages received over multiple TCP connections, and wherein said modified TCP tunnel protocol header is always read first.

2. The method of claim 1 wherein said using said physical links further comprises distributing messages among a plurality of said physical links.

3. The method of claim 2 further comprising ordering received messages from said plurality of said physical links into a single stream.

4. The method of claim 1 further comprising providing bandwidth management by using said physical links to increase bandwidth for an application and to remove bandwidth for an application.

5. The method of claim 1 further comprising using said physical links to provide flow control, wherein more physical links are used to increase flow and less physical links are used to reduce flow.

6. The method of claim 5 wherein said using said physical links to provide flow control comprises using said physical links to perform at least one of the group consisting of limiting a number of physical links, limiting a message rate, limiting a rate per link and limiting a rate per a collection of links.

7. The method of claim 1 wherein said establishing a logical link further comprises securing said logical link using Transport Layer Security (TLS).

8. The method of claim 1 further comprising recovering failed connections between said first endpoint and said second endpoint.

9. The method of claim 1 further comprising retransmitting lost messages between said first endpoint and said second endpoint.

10. A non-transitory computer readable storage medium having computer readable code thereon for providing network link bonding and management, the medium comprising:
instructions for establishing a plurality of physical links between a first endpoint and a second endpoint, each physical link comprising a Transmission Control Protocol (TCP) link, and wherein said TCP links are in parallel with each other;
instructions for establishing a logical link at an application server level between said first endpoint and said second endpoint, said logical link including said physical links;
instructions for using said physical links to provide communications between said first endpoint and said second endpoint; and
instructions for using said physical links to provide link redundancy and wherein said communications occur at the transport layer of the Open System Interconnect (OSI) model using a modified TCP tunnel protocol header, wherein said modified TCP tunnel protocol header includes a plurality of fields added to an original TCP tunnel protocol header to form a ten byte header to allow messages to be multiplexed over multiple TCP connections within said logical link, wherein a first field of said plurality of fields added to an original TCP tunnel protocol header comprises an ID field used for identifying a logical link for which the message is intended, and wherein a second field of said plurality of fields added to an original TCP tunnel protocol header comprises a Send sequence number field used for re-ordering messages received over multiple TCP connections, and wherein said modified TCP tunnel protocol header is always read first.

11. The computer readable medium of claim 10 wherein said instructions for said using said physical links further comprises instructions for distributing messages among a plurality of said physical links and instructions for ordering received messages from said plurality of said physical links into a single stream.

12. The computer readable medium of claim 10 further comprising instructions for using said physical links to provide flow control by performing at least one of the group consisting of limiting a number of physical links, limiting a message rate, limiting a rate per link and limiting a rate per a collection of links, wherein more physical links are used to increase flow and less physical links are used to reduce flow.

13. The computer readable medium of claim 10 further comprising instructions for securing said logical link using transport Layer Security (TLS).

14. The computer readable medium of claim 10 further comprising instructions for performing at least one of the group consisting of recovering failed connections between said first endpoint and said second endpoint, and retransmitting lost messages between said first endpoint and said second endpoint.

15. A computer system comprising:
a memory;
a processor;
a communications interface;
an interconnection mechanism coupling the memory, the processor and the communications interface; and
wherein the memory is encoded with a network link bonding and management application that when performed on the processor, provides a process for processing information, the process causing the computer system to perform the operations of:
establishing a plurality of physical links between a first endpoint and a second endpoint, each physical link comprising a Transmission Control Protocol (TCP) link, and wherein said TCP links are in parallel with each other;
establishing a logical link at an application server level between said first endpoint and said second endpoint, said logical link including said physical links;
using said physical links to provide communications between said first endpoint and said second endpoint; and
using said physical links to provide link redundancy and wherein said communications occur at the transport layer of the Open System Interconnect (OSI) model using a modified TCP tunnel protocol header, wherein said modified TCP tunnel protocol header includes a plurality of fields added to an original TCP tunnel protocol header to form a ten byte header to allow messages to be multiplexed over multiple TCP connections within said logical link, wherein a first field of said plurality of fields added to an original TCP tunnel protocol header comprises an ID field used for identifying a logical link for which the message is intended, and wherein a second field of said plurality of fields added to an original TCP tunnel protocol header comprises a Send sequence number field used for re-ordering messages received over multiple TCP connections, and wherein said modified TCP tunnel protocol header is always read first.

16. The computer system of claim 15 wherein said system performs the operations of distributing messages among a plurality of said physical links and performs the operation of ordering received messages from said plurality of said physical links into a single stream.

17. The computer system of claim 15 wherein said system further performs the operations of using said physical links to provide flow control by performing at least one of the group comprising limiting a number of physical links, limiting a message rate, limiting a rate per link and limiting a rate per a collection of links wherein more physical links are used to increase flow and less physical links are used to reduce flow.

18. The computer system of claim 15 wherein said system further performs the operation of securing said logical link using TLS.

19. The computer system of claim 15 wherein said system further performs at least one of the group consisting of recovering failed connections between said first endpoint and said second endpoint and retransmitting lost messages between said first endpoint and said second endpoint.

\* \* \* \* \*